United States Patent
Lee et al.

(10) Patent No.: US 12,135,379 B2
(45) Date of Patent: Nov. 5, 2024

(54) METHOD AND APPARATUS FOR HANDLING EPHEMERIS INFORMATION FOR A NTN CELL IN A WIRELESS COMMUNICATION SYSTEM

(71) Applicant: LG ELECTRONICS INC., Seoul (KR)

(72) Inventors: Oanyong Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

(21) Appl. No.: 17/692,060

(22) Filed: Mar. 10, 2022

(65) Prior Publication Data

US 2022/0291394 A1  Sep. 15, 2022

(30) Foreign Application Priority Data

Mar. 11, 2021 (KR) .......................... 10-2021-0032198

(51) Int. Cl.
*G01S 19/25* (2010.01)
*H04W 24/10* (2009.01)
*H04W 76/20* (2018.01)
*H04W 84/06* (2009.01)

(52) U.S. Cl.
CPC .......... *G01S 19/258* (2013.01); *H04W 24/10* (2013.01); *H04W 76/20* (2018.02); *H04W 84/06* (2013.01)

(58) Field of Classification Search
CPC ...... G01S 19/258; H04W 76/20; H04W 24/10
USPC ..................................................... 342/357.64
See application file for complete search history.

(56) References Cited

U.S. PATENT DOCUMENTS

2019/0094382 A1* 3/2019 Sekitsuka .............. G04G 5/002
2024/0129867 A1* 4/2024 Ma ...................... H04W 56/001

FOREIGN PATENT DOCUMENTS

ES      2953860 T3 *  11/2023  ............. G01S 19/05

OTHER PUBLICATIONS

3rd Generation Partnership Project (3GPP), "Technical Specification Group Radio Access Network; Solutions for NR to support non-terrestrial networks (NTN) (Release 16)," Sections 7.3.6 and A.1 of 3GPP TS 38.821 V16.0.0, Dec. 2019, 140 pages.

* cited by examiner

*Primary Examiner* — Harry K Liu
(74) *Attorney, Agent, or Firm* — LEE, HONG, DEGERMAN, KANG & WAIMEY

(57) ABSTRACT

A method and apparatus for handling ephemeris information for a NTN cell in a wireless communication system is provided. A wireless device may receive, from a network, an ephemeris information related to a Non-Terrestrial Networks (NTN) cell. The wireless device may determine whether the ephemeris information is valid or not, based on whether the measurement on the NTN cell is able to be performed during the service time of the NTN cell. Based on determining that the ephemeris information is not valid, the wireless device may transmit, to the network, (1) information informing that the ephemeris information is not valid and (2) information on time at which the measurement on the NTN cell is able to be performed.

12 Claims, 13 Drawing Sheets

METHOD AND APPARATUS FOR HANDLING EPHEMERIS INFORMATION FOR A NTN CELL IN A WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2021-0032198, filed on Mar. 11, 2021, the contents of which are hereby incorporated by reference herein in its entirety.

BACKGROUND

Technical Field

The present disclosure relates to a method and apparatus for handling ephemeris information for a NTN cell in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Thanks to the wide service coverage capabilities and reduced vulnerability of space/airborne vehicles to physical attacks and natural disasters, non-terrestrial networks (NTN) are expected to:

foster the roll out of 5G service in un-served areas that cannot be covered by terrestrial 5G network (isolated/remote areas, on board aircrafts or vessels) and underserved areas (e.g., sub-urban/rural areas) to upgrade the performance of limited terrestrial networks in cost effective manner, reinforce the 5G service reliability by providing service continuity for machine-to-machine (M2M)/Internet-of-things (IoT) devices or for passengers on board moving platforms (e.g., passenger vehicles-aircraft, ships, high speed trains, bus) or ensuring service availability anywhere especially for critical communications, future railway/maritime/aeronautical communications, and to enable 5G network scalability by providing efficient multicast/broadcast resources for data delivery towards the network edges or even user terminal.

SUMMARY

Technical Objects

In NTN, ephemeris information may be provided to UEs. The ephemeris information may contain orbital trajectories of artificial satellites. The orbital trajectories contained in the ephemeris information may represent schedule information of the LEO satellites, for example, when and how long each neighbour LEO satellite will appear to the UEs.

If the ephemeris information is broadcast, it may include information on the general neighbour LEO satellites which will appear to most of the UEs in the cell coverage because it is cell-specific. If the ephemeris information is provided via dedicated signalling, then it may include the LEO satellites which will appear to the UE location because it is UE-specific. Therefore, the UE-specific ephemeris information may be more accurate from the UE's perspective because UE's location information is considered.

However, as LEO satellites moves few kilometres per second in the space and its cell coverage on the ground dynamically changes by time, the ephemeris of the LEO satellites in the ephemeris information may not be correctly provided to the UEs.

For example, ephemeris information implies that an LEO satellite will appear to a UE from 9:00 PM to 9:10 PM, but the LEO satellite may appear at 9:15 PM. This mis-configuration may occur because of estimation error between satellite position and UE location. If this mis-configuration is repeated, as the ephemeris information may be used for cell selection/reselection criterion and CHO triggering condition, it may occur degradation of UE mobility performance.

Therefore, if UE detects wrong ephemeris of an LEO satellite, it should be reported to the network so that the network adjusts the ephemeris information to avoid the repetition of configuring wrong ephemeris information.

Therefore, studies for validity feedback of ephemeris information for a NTN cell in a wireless communication system are required.

Technical Solutions

In an aspect, a method performed by a wireless device in a wireless communication system is provided. The wireless device may receive, from a network, an ephemeris information related to a Non-Terrestrial Networks (NTN) cell. The ephemeris information may include information on service time of the NTN cell. The wireless device may attempt to perform measurement on the NTN cell. The wireless device may determine whether the ephemeris information is valid or not, based on whether the measurement on the NTN cell is able to be performed during the service time of the NTN cell. Based on determining that the ephemeris information is not valid, the wireless device may transmit, to the network, (1) information informing that the ephemeris information is not valid and (2) information on time at which the measurement on the NTN cell is able to be performed.

In another aspect, an apparatus for implementing the above method is provided.

Technical Effects

The present disclosure can have various advantageous effects.

According to some embodiments of the present disclosure, a wireless device could perform validity feedback of ephemeris information for a NTN cell efficiently.

According to some embodiments of the present disclosure, a wireless device could efficiently report an error in the ephemeris information.

According to some embodiments of the present disclosure, a network could efficiently update the ephemeris information for a wireless device.

For example, if ephemeris information of a satellite is mis-configured (that is, the configured satellite ephemeris is wrong so that the UE cannot measure the cell of the satellite on a configured time), the UE could report to the network that there was an error in the ephemeris information so that the network can update or adjust the ephemeris information based on the received information.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
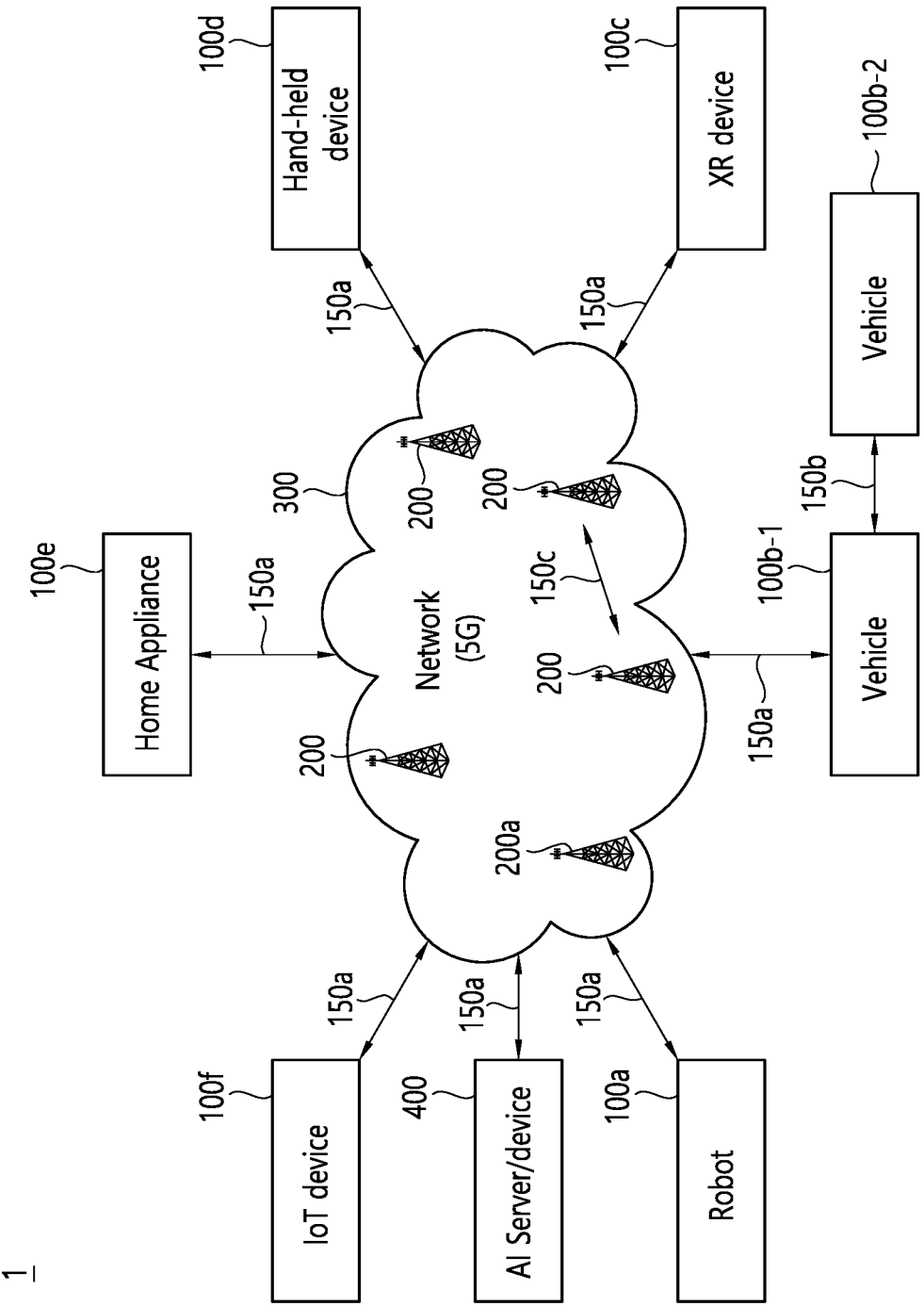
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
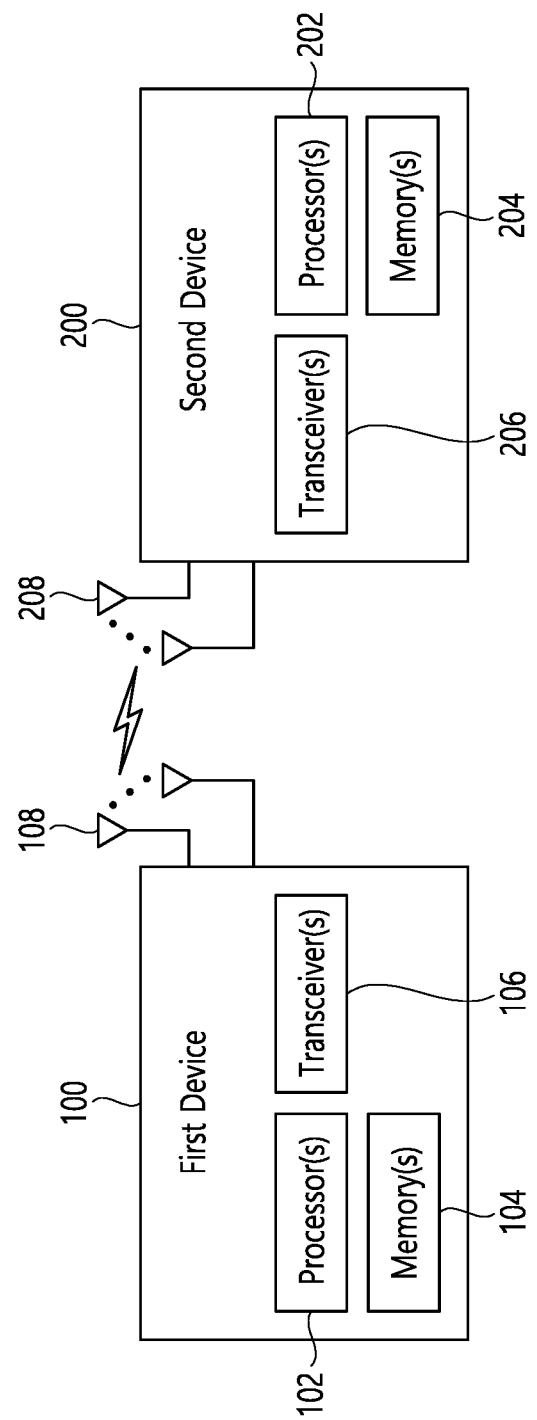
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. As an example, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
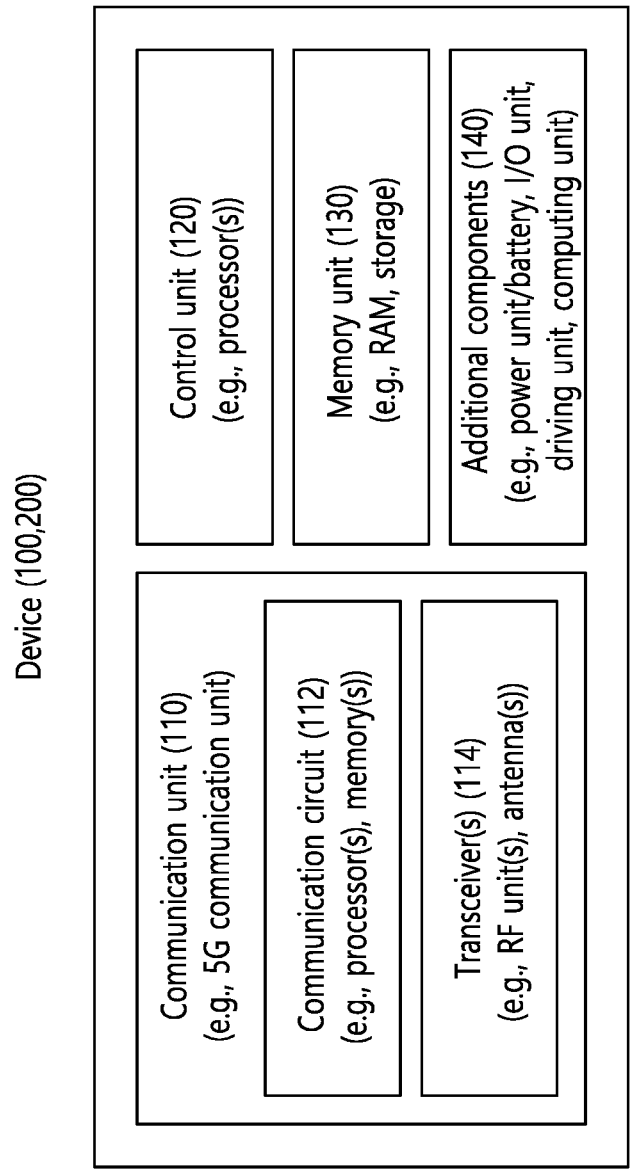
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
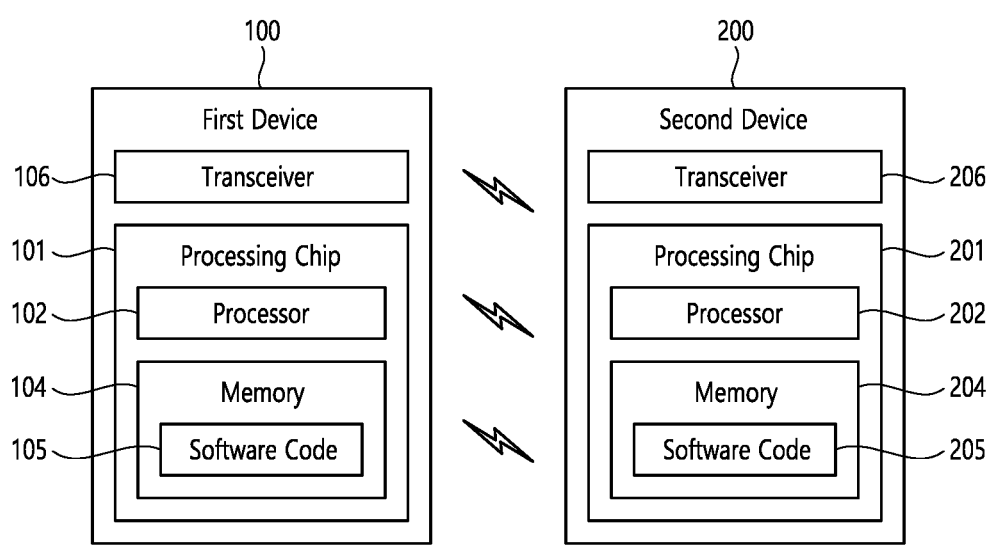
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
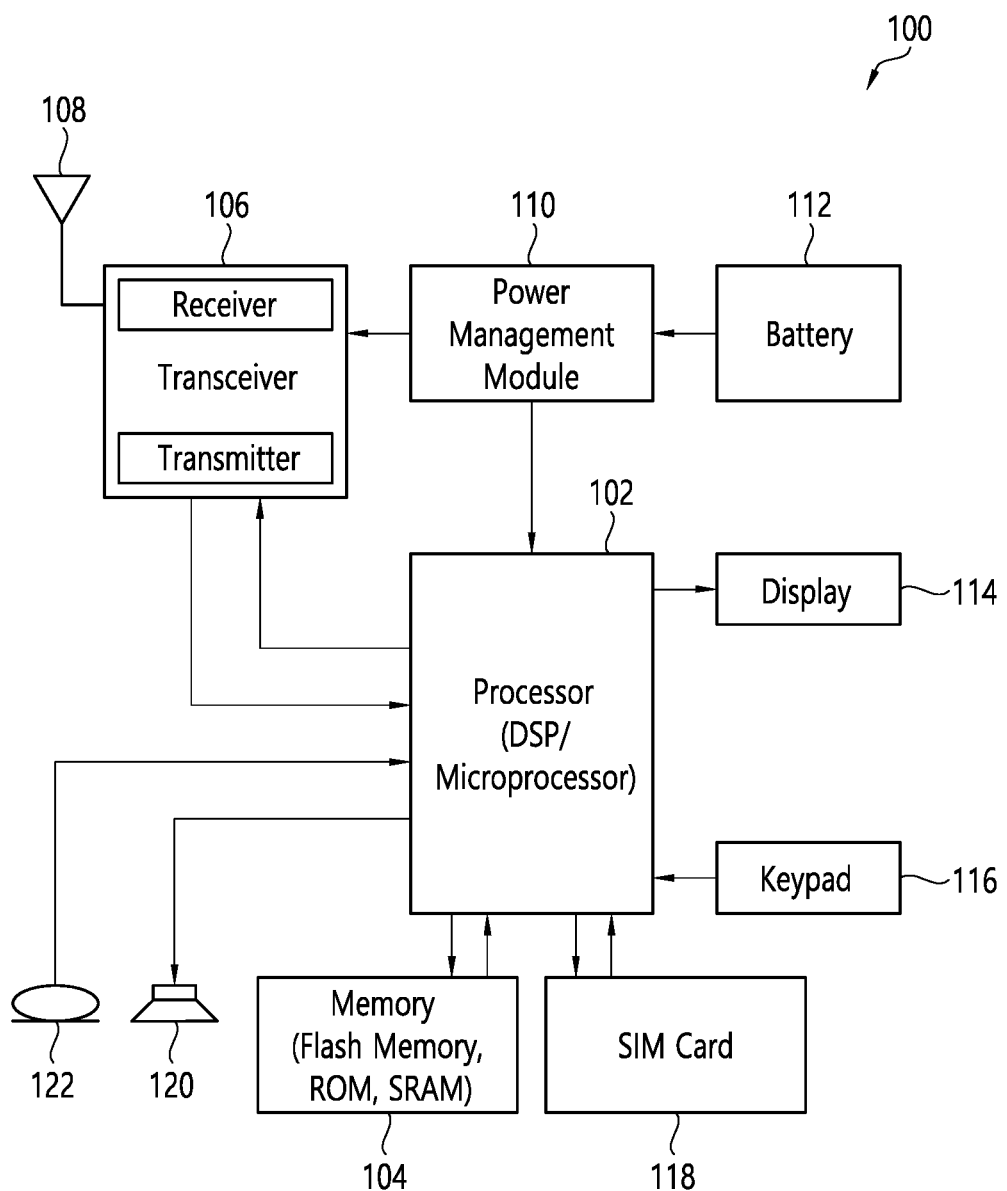
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
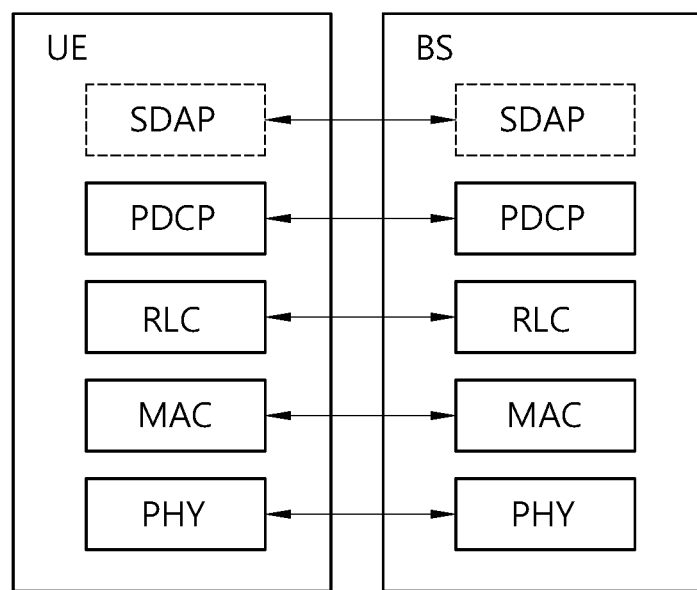
FIGS. 6 and 7 show an example of protocol stacks in a 3GPP based wireless communication system to which implementations of the present disclosure is applied.
Figure 7:
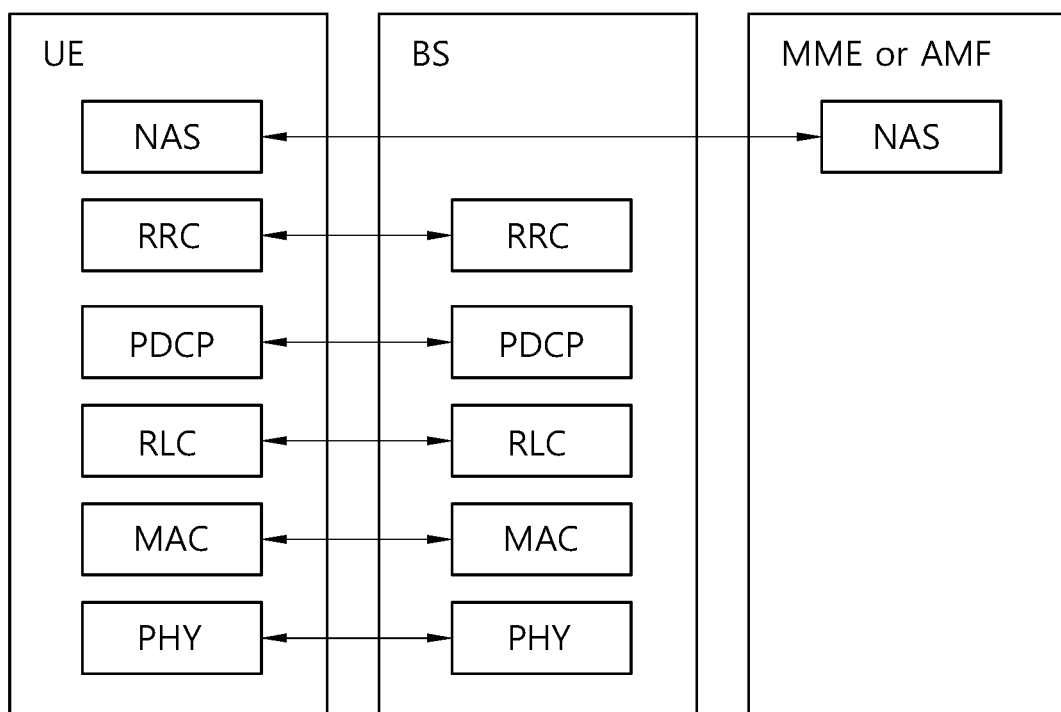

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer; UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
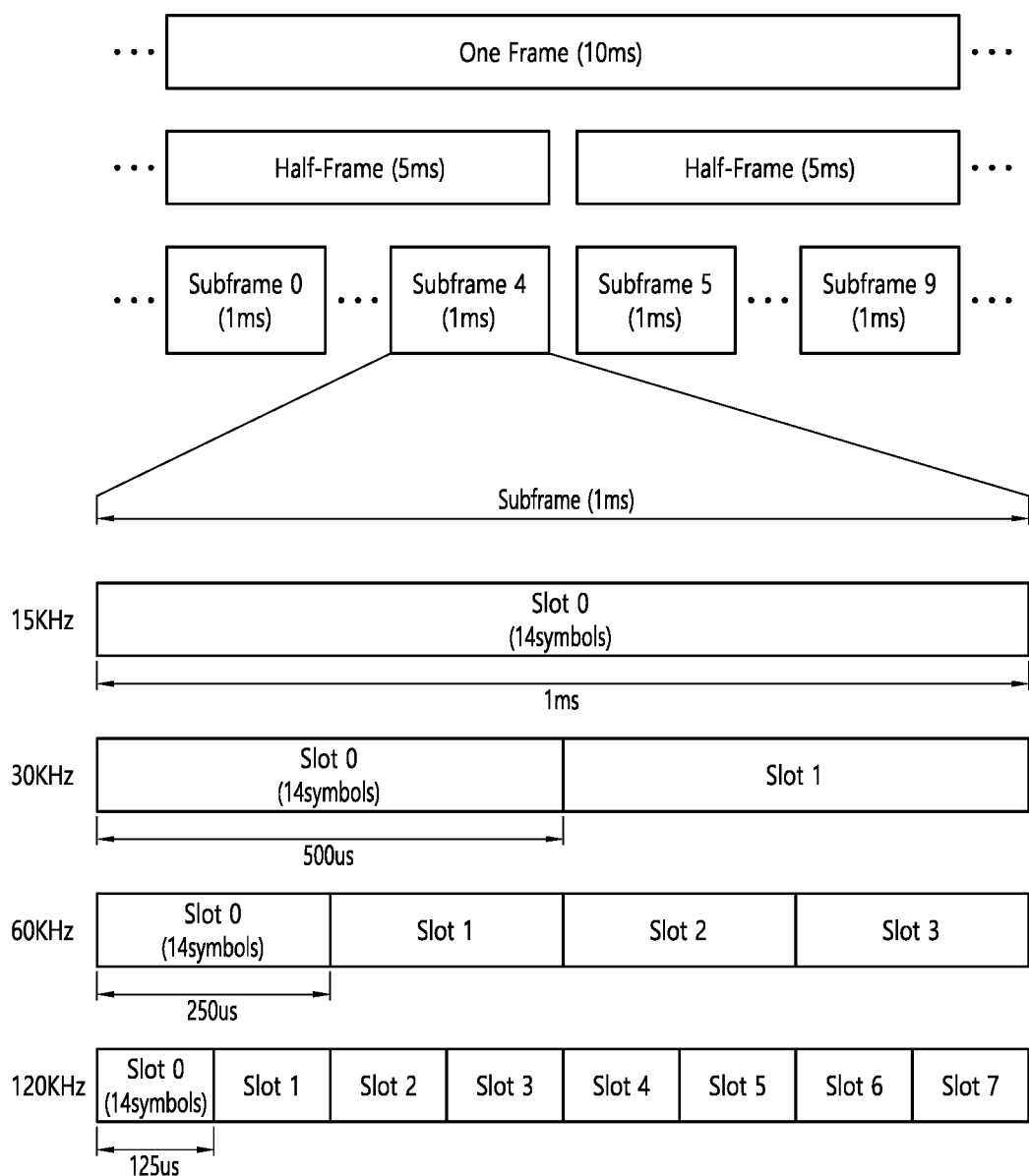
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna portp, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
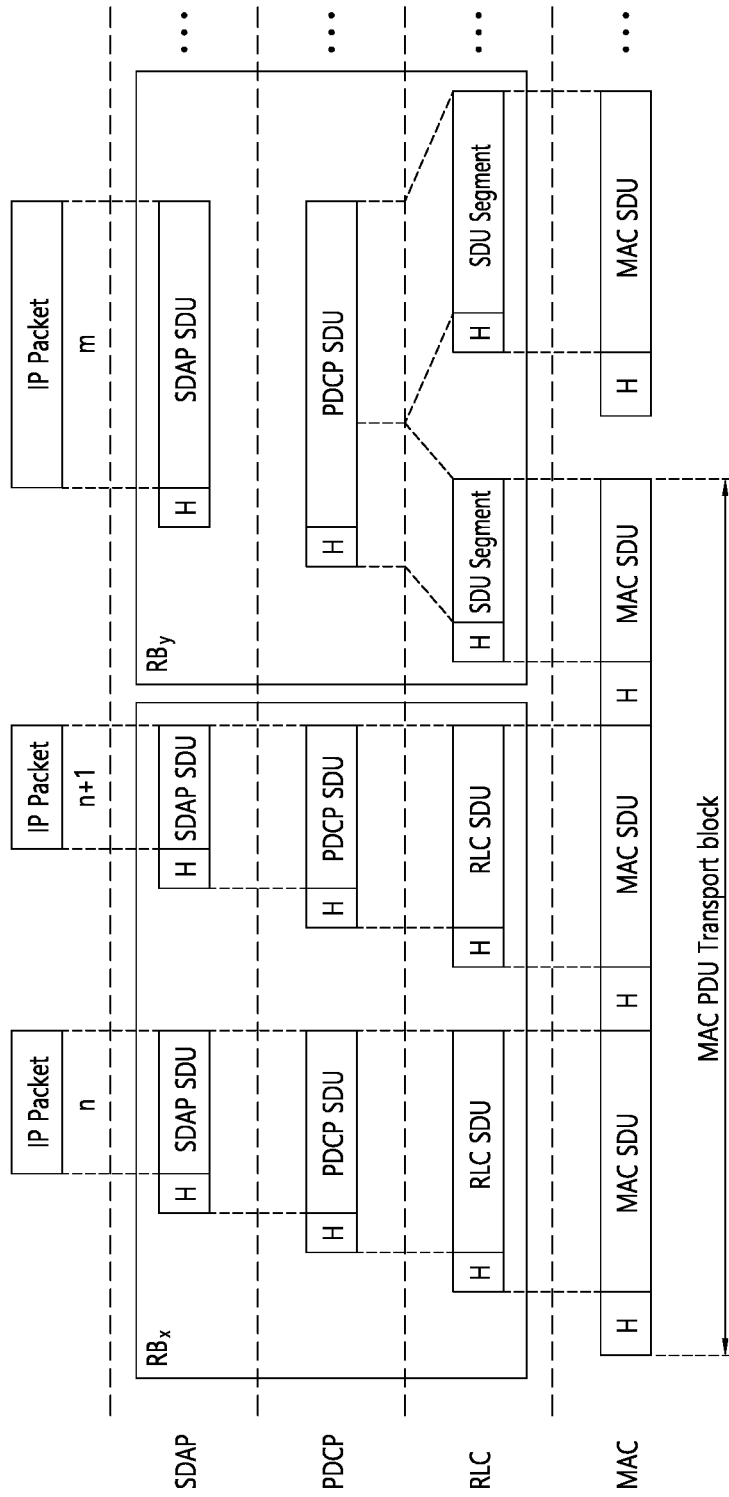
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, technical features related to ephemeris data for NTN are described. Sections 7.3.6 and A.1 of 3GPP TS 38.821 v16.0.0 may be referred.

Representation of Complete Ephemeris Data

Ephemeris data contains the information about the orbital trajectories of artificial satellites. There are different possible representations of ephemeris data. One possibility is to use orbital parameters, e.g. semi-major axis, eccentricity, inclination, right ascension of the ascending node, argument of periapsis, mean anomaly at a reference point in time, and the epoch. The first five parameters can determine an orbital plane, and the other two parameters are used to determine exact satellite location at a time.

Table 5 shows a description for the orbital parameters, for example, essential elements of ephemeris.

TABLE 5

| Orbital plane parameters | $\sqrt{a}$ | Square root of semi major axis (semi-major axis) |
| --- | --- | --- |
| | e | Eccentricity (eccentricity) |
| | $i_0$ | Inclination angle at reference time (inclination) |
| | $\Omega_0$ | Longitude of ascending node of orbit plane (right ascension of the ascending node) |
| | $\omega$ | Argument of perigee (argument of periapsis) |
| Satellite level parameters | $M_0$ | Mean anomaly at reference time (true anomaly and a reference point in time) |
| | $t_{0e}$ | Ephemeris reference time (the epoch) |

True anomaly is the actual measured angle in the orbital plane between the vector extending from the focus to the point of periapsis and the vector extending from the focus to the object's actual position. Mean anomaly is the angle between the periapsis point and the imagined position of an object for the same elapsed time since periapsis for a circular orbit around the same body with the same orbital position. The key difference is that mean anomaly always increases linearly with time. The true anomaly, in general, does not, except if the orbital is circular, in which case the mean anomaly and true anomaly are almost identical. True and mean anomaly can be linked together thanks to the eccentric anomaly.

Figure 10:
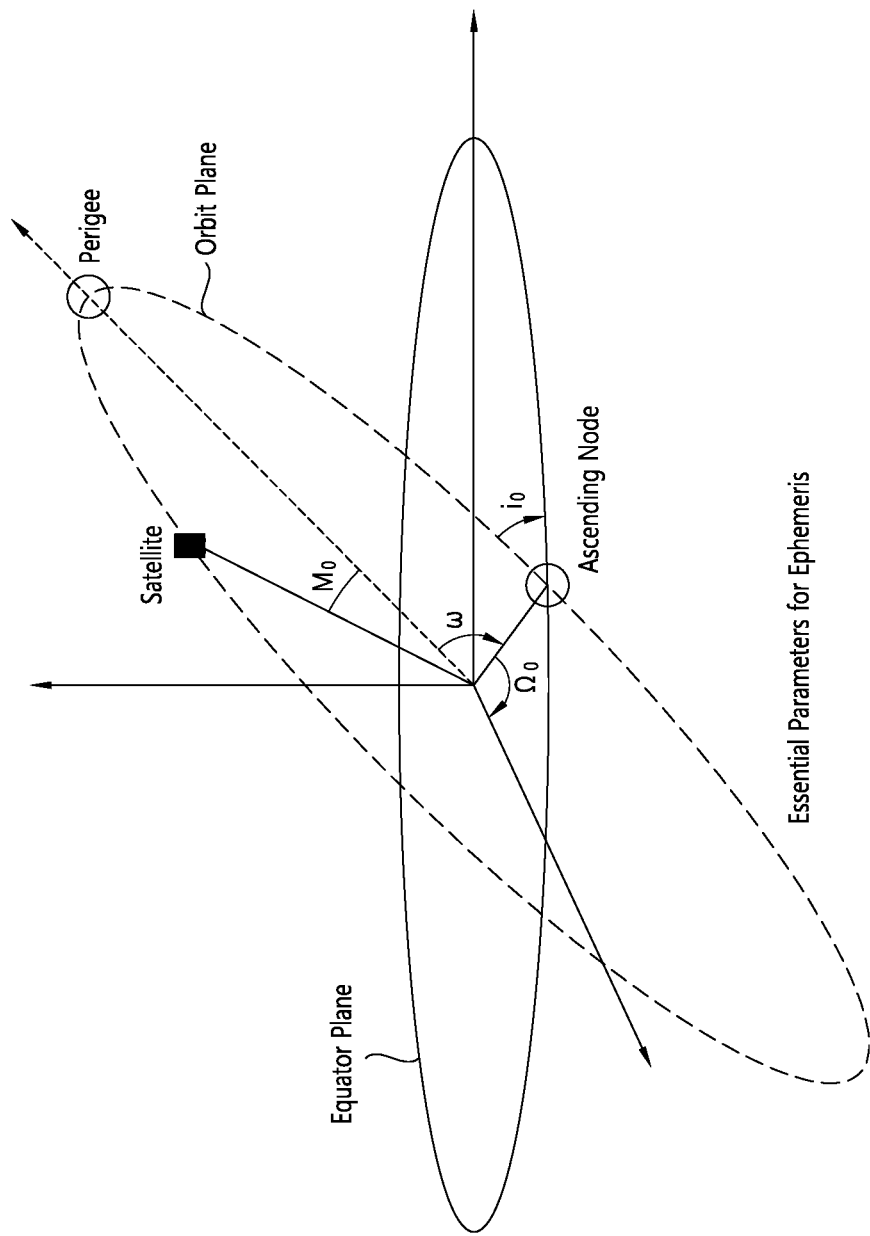
FIG. 10 shows an example of orbital parameters to which implementations of the present disclosure is applied.

FIG. 10 shows an example of orbital parameters to which implementations of the present disclosure is applied.

In particular, FIG. 10 illustrates satellite orbit and Keplerian Elements.

Another possible option is to provide the location of the satellite in coordinates (x, y, z), e.g. ECEF coordinates. For anything else than GEO, additionally a velocity vector (vx, vy, vz) and again a reference point in time are needed.

It seems that this option has the drawback that—for LEO satellites—it prevents the UE from extrapolating the satellite track for more than a very short time into the future. Since a LEO satellite moves very fast, the given position (x, y, z) may be outdated in a short period of time. And since the satellite moves in an elliptical orbit, providing a velocity vector (vx, vy, vz) does not help much; so it remains to be studied the required accuracy—to determine the satellite location with acceptable precision. As a result, the satellite would need to provide (e.g. broadcast) an updated location very often, about every few minutes. Furthermore, for the same reason it is unclear how to pre-provision a UE with ephemeris information in coordinates.

Provision and Use of Ephemeris Data

In all cases, the minimum representation needs at least seven double-precision floating point numbers, plus some overhead. This means that, for satellite networks with many satellites, the ephemeris data can be quite substantial. The exact data size for a LEO network depends on the number of satellites, which may be several hundreds, and the accuracy of which the ephemeris parameters are represented.

In a satellite network, the orbits of all satellites are however not independent, as several satellites typically share a common orbital plane. To reduce the amount of data needed, the ephemeris data could provide information not for every single satellite, but only for the common orbital planes. Even for a network with 100 orbital planes, the ephemeris data would then amount to only a few kB. The ephemeris data may be provisioned a file containing the ephemeris data in the uSIM of the UE or directly in UE itself.

As mentioned above, the size of the ephemeris data can be quite substantial for networks with many satellites, and easily exceeds the capacity of a uSIM which is one way for pre-provisioning the ephemeris data, which typically is 128 kB. The ephemeris data file on the uSIM may thus contain only information about the orbital planes. In this case, the ephemeris data would not provide the location of a specific satellite but describe an arc in the sky above the UE which the UE would need to scan for a satellite. According to the definitions of orbital parameters, the first five parameters, i.e. semi-major axis, eccentricity, inclination, right ascension of the ascending node, argument of periapsis, are used to determine the elliptical orbit. So these parameters can be provisioned to UE as baseline ephemeris data.

These baseline ephemeris data or orbital planes may be indexed and further quantized and sub-indexed. The indexes can then be used in RRC in an efficient way to point to stored ephemeris data. The UE can be given information about ephemeris data of other cells by using the ephemeris plane information. For example, when a UE is asked to do RRM measurements, the UE is given the index of the orbital plane where the cell to be measured can be found.

With the help of ephemeris data, a UE may search for the first NTN cell it could connect to. After detecting PSS/SSS (SSB) of a cell broadcasted by a satellite, the UE may be able to read the initial system information of that cell. Ideally, before attempting to access the cell, the UE knows the RTT well enough to be able to do random access. For this, the initial system information may need to contain further ephemeris information on the exact location of the cell (or the satellite broadcasting the cell). This information can be given with respect to the orbital plane that the UE already has information about.

Considering that the orbit-plane level orbital parameters are not sufficient to derive the satellite position while the satellite level orbital parameters is more helpful for UE to search for the first NTN cell and perform initial access, it is worthwhile evaluating some other solutions to provide satellite level orbital parameters. In addition to the first five orbital parameters for orbital plane, the other two orbital parameters including mean anomaly at a reference point in time and the epoch are used to determine the exact satellite location at a time.

As mentioned above, the main concern for proving the satellite level orbital parameters is about the size of such information. However, there is no need for a UE to store orbital parameters for all the satellites. If the orbital parameters per satellite are pre-provisioned, UE only needs to store the ephemeris data for the satellites that may serve UE Another possible solution to address the size concern of the satellite level orbital parameters is to broadcast the orbital parameters of the serving satellite and several neighbouring satellites which will be sufficient for initial access and mobility handling at UE side. Thus, the following solutions can be considered to provide orbital parameters per satellite:

Pre-provision satellite level orbital parameters for all the satellites that may serve the UE in uSIM/UE and the ephemeris data for each satellite can be linked to a satellite ID or index. Broadcast the satellite ID or index of the serving satellite in system information so that UE is able to find the corresponding detailed ephemeris data stored in uSIM to derive the position coordinates of the serving satellite. The satellite ID or index of neighbour satellites can also be provided to UE via system information or dedicated RRC signalling to assist mobility handling.

Broadcast satellite level orbital parameters of the serving satellite in system information and UE will derive the position coordinates of the serving satellite. The ephemeris data of the neighbouring satellites can also be provided to UE via system information or dedicated RRC signalling. In case the baseline orbital plane parameters are provisioned in uSIM/UE, only mean anomaly at a reference point in time and the epoch need to be broadcasted to UE, in this way signalling overhead can be reduced significantly.

Updating Stored Ephemeris Data

For the solutions in which the orbital parameters for the common orbit planes or for all the satellites that may serve the UE are pre-provisioned, the accuracy of the prediction of a satellite orbit or the satellite position decreases the further in the future one tries to extend the prediction. It might thus be needed to update the ephemeris data stored in the UE. The validity time of stored ephemeris data might depend on the orbital parameters of the NTN satellite, and on the required accuracy of its prediction. Since the validity time determines the frequency of the updates, it should be studied further.

The main purpose of the ephemeris data provided by network is to provide the UE with ephemeris data for initial access, e.g. if it is expected to be switched off for a longer time; or in other words, as a replacement for the data stored in the UE. As such, it may also contain information on orbital plane level or on satellite level.

The UE should always use the most current ephemeris data. Once the UE has obtained new ephemeris data, the parameters stored in the UE are thus obsolete and should no longer be used or be overwritten with the newer values. Every parameter in the UE has an associated priority statement. By giving the parameters in the UE lower priority, the UE can be prevented from using the obsolete values stored in the UE.

Key Parameters

Key parameters of orbital mechanics of all commercial satellites are publicly available from multiple sources. This information is called ephemeris, which is used by astronomers to describe the location and orbital behaviour of stars and any other astronomical bodies.

Typically, ephemeris is expressed in an ASCII file using Two-Line Element (TLE) format. The TLE data format encodes a list of orbital elements of an Earth-orbiting object in two 70-column lines.

Tables 6 and 7 may show contents of the TLE table. Table 6 may show first line of the ephemeris. Table 7 may show second line of the ephemeris

TABLE 6

| Field | Columns | Content |
|---|---|---|
| 1 | 01-01 | Line number (1) |
| 2 | 03-07 | Satellite number |
| 3 | 08 08 | Classification (U = Unclassified) |
| 4 | 10-11 | International Designator (Last two digits of launch year) |
| 5 | 12-14 | International Designator (Launch number of the year) |
| 6 | 15-17 | International Designator (piece of the launch) |
| 7 | 19-20 | Epoch Year (last two digits of year) |
| 8 | 21-32 | Epoch (day of the year and fractional portion of the day) |
| 9 | 34-43 | First Time Derivative of the Mean Motion divided by two |
| 10 | 45-52 | Second Time Derivative of Mean Motion divided by six (decimal point assumed) |
| 11 | 54-61 | BSTAR drag term (decimal point assumed) |
| 12 | 63-63 | The number 0 (originally this should have been "Ephemeris type") |
| 13 | 65-68 | Element set number. Incremented when a new TLE is generated for this object. |
| 14 | 69-69 | Checksum (modulo 10) |

TABLE 7

| Field | Columns | Content |
|---|---|---|
| 1 | 01-01 | Line number (2) |
| 2 | 03-07 | Satellite number |
| 3 | 09-16 | Inclination (degrees) |
| 4 | 18-25 | Right ascension of the ascending node (degrees) |
| 5 | 27-33 | Eccentricity (decimal point assumed) |
| 6 | 35-42 | Argument of perigee (degrees) |
| 7 | 44-51 | Mean Anomaly (degrees) |
| 8 | 53-63 | Mean Motion (revolutions per day) |
| 9 | 64-68 | Revolution number at epoch (revolutions) |
| 10 | 69-69 | Checksum (modulo 10) |

The TLE format is an expression of mean orbital parameters "True Equator, Mean Equinox", filtering out short term perturbations.

From its TLE format data, the SGP4 (Simplified General Propagation) model [10] is used to calculate the location of the space object revolving about the earth in True Equator Mean Equinox (TEME) coordinate. Then it can be converted into the Earth-Centered, Earth-Fixed (ECEF) Cartesian x, y, z coordinate as a function of time.

The instantaneous velocity at that time can also be obtained. In ECEF coordinate, z-axis points to the true North, while x axis and y axis intersects 0-degrees latitude and longitude respectively as illustrated in FIG. 11.

Figure 11:
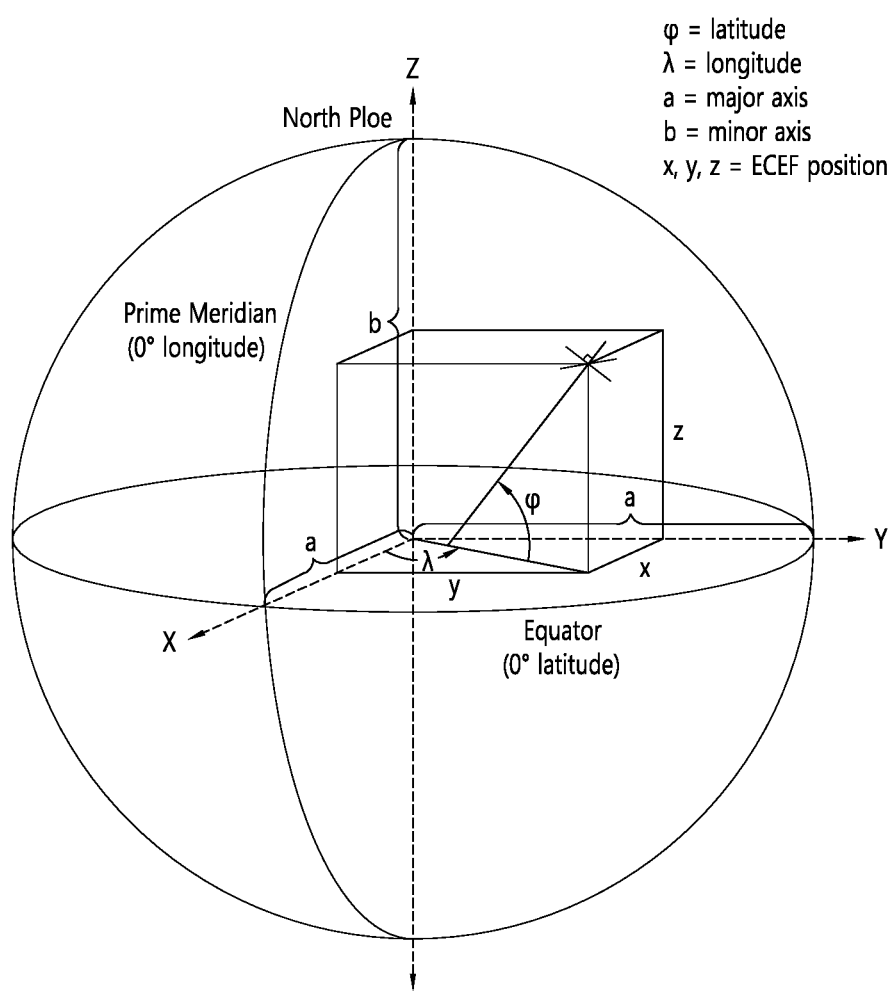
FIG. 11 shows an example of Earth-Centered, Earth-Fixed (ECEF) coordinates in relation to latitude and longitude to which implementations of the present disclosure is applied.

FIG. 11 shows an example of Earth-Centered, Earth-Fixed (ECEF) coordinates in relation to latitude and longitude to which implementations of the present disclosure is applied.

Table 8 shows an example of ephemeris converted into ECEF format for the Telestar-19 satellite.

TABLE 8

| Epoch (day, hr, min, sec) | X[km] | Y[km] | Z[km] | dX/dt [km/s] | dY/dt [km/s] | dZ/dt [km/s] |
|---|---|---|---|---|---|---|
| 2018 Oct. 26 02:00:00.000 | 19151.529 | −37578.251 | 17.682 | −0.00151 | −0.00102 | −0.00106 |
| 2018 Oct. 26 02:05:00.000 | 19151.073 | −37578.556 | 17.359 | −0.00152 | −0.00101 | −0.00109 |
| 2018 Oct. 26 02:10:00.000 | 19150.614 | −37578.855 | 17.029 | −0.00154 | −0.00099 | −0.00112 |
| 2018 Oct. 26 02:15:00.000 | 19150.150 | −37579.151 | 16.690 | −0.00155 | −0.00098 | −0.00114 |

Given a specific point in time, it is straightforward to calculate the satellite location by interpolation. The example given above refers to a geosynchronous (GEO) satellite, in which the epoch interval is 5 minutes. For LEO satellites, the intervals may be much shorter, on the order of seconds.

As described above, in NTN, ephemeris information may be provided to UEs. The ephemeris information may contain orbital trajectories of artificial satellites. The orbital trajectories contained in the ephemeris information may represent schedule information of the LEO satellites, for example, when and how long each neighbour LEO satellite will appear to the UEs.

If the ephemeris information is broadcast, it may include information on the general neighbour LEO satellites which will appear to most of the UEs in the cell coverage because it is cell-specific. If the ephemeris information is provided via dedicated signalling, then it may include the LEO satellites which will appear to the UE location because it is UE-specific. Therefore, the UE-specific ephemeris information may be more accurate from the UE's perspective because UE's location information is considered.

However, as LEO satellites moves few kilometres per second in the space and its cell coverage on the ground dynamically changes by time, the ephemeris of the LEO satellites in the ephemeris information may not be correctly provided to the UEs.

For example, ephemeris information implies that an LEO satellite will appear to a UE from 9:00 PM to 9:10 PM, but the LEO satellite may appear at 9:15 PM. This mis-configuration may occur because of estimation error between satellite position and UE location. If this mis-configuration is repeated, as the ephemeris information may be used for cell selection/reselection criterion and CHO triggering condition, it may occur degradation of UE mobility performance.

Therefore, if UE detects wrong ephemeris of an LEO satellite, it should be reported to the network so that the network adjusts the ephemeris information to avoid the repetition of configuring wrong ephemeris information.

Therefore, studies for validity feedback of ephemeris information for a NTN cell in a wireless communication system are required.

Hereinafter, a method for handling ephemeris information for a NTN cell in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 12:
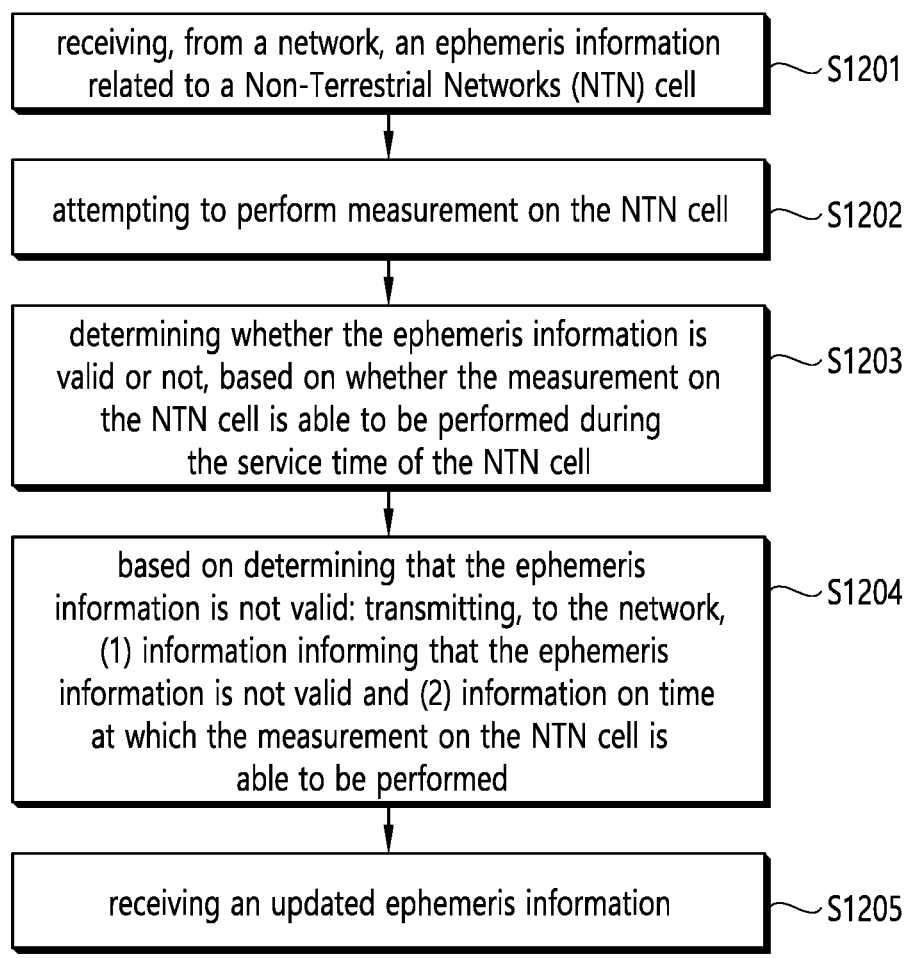
FIG. 12 shows an example of a method for handling ephemeris information for a NTN cell in a wireless communication system.

FIG. 12 shows an example of a method for handling ephemeris information for a NTN cell in a wireless communication system.

In particular, FIG. 12 shows an example of a method performed by a wireless device in a wireless communication system.

In step S1201, a wireless device may receive, from a network, an ephemeris information related to a Non-Terrestrial Networks (NTN) cell.

For example, the ephemeris information may include information on service time of the NTN cell.

For example, the ephemeris information may include information on satellite ephemeris. The information on satellite ephemeris may include (i) list of satellites and (ii) schedule information for each satellite in the list of satellites. For example, the schedule information may include information on service time in which the each satellite is able to provide NTN service to the wireless device.

For example, the ephemeris information may be provided via broadcast system information from the network. For other example, the ephemeris information may be provided via a dedicated signalling from the network.

In step S1202, a wireless device may attempt to perform measurement on the NTN cell.

For example, the wireless device may attempt to measure Reference Signal Received Power (RSRP) and/or Reference Signal Received Quality (RSRQ) for the NTN cell.

In step S1203, a wireless device may determine whether the ephemeris information is valid or not, based on whether the measurement on the NTN cell is able to be performed during the service time of the NTN cell.

For example, the wireless device may determine that the ephemeris information is valid, based on that the measurement on the NTN cell is able to be performed during the service time of the NTN cell.

For example, the wireless device may determine that the ephemeris information is not valid, based on that the measurement on the NTN cell is not able to be performed during the service time of the NTN cell.

For example, the wireless device may determine that the measurement on the NTN cell is available, based on that the wireless device is able to measure Reference Signal Received Power (RSRP) and/or Reference Signal Received Quality (RSRQ) for the NTN cell.

For example, the wireless device may determine that the measurement on the NTN cell is available based on that the measured RSRP and/or RSRQ for the NTN cell is equal to or greater than a threshold value. For other example, the wireless device may determine that the measurement on the NTN cell is available based on that the measured RSRP and/or RSRQ for the NTN cell is greater than a threshold value. The threshold value may be configured by the network or the wireless device.

For example, the wireless device may determine that the ephemeris information is not valid, based on that (i) the measurement on the NTN cell is not able to be performed during the service time of the NTN cell, and (ii) the measurement on the NTN cell is able to be performed outside the service time of the NTN cell.

In step S1204, based on determining that the ephemeris information is not valid, a wireless device may transmit, to the network, (1) information informing that the ephemeris information is not valid and (2) information on time at which the measurement on the NTN cell is able to be performed.

For example, the wireless device may transmit a certain message including (1) the information informing that the ephemeris information is not valid and (2) the information on time at which the measurement on the NTN cell is able to be performed.

For example, based on determining that the ephemeris information is not valid, the wireless device may further transmit, to the network, information on time difference between the service time and the time at which the measurement on the NTN cell is able to be performed. For example, the certain message may further include the information on time difference between the service time and the time at which the measurement on the NTN cell is able to be performed.

For example, based on determining that the ephemeris information is not valid, the wireless device may further transmit, to the network, information informing that the measurement on the NTN cell is able to be performed outside the service time of the NTN cell. For example, the certain message may further include the information informing that the measurement on the NTN cell is able to be performed outside the service time of the NTN cell.

For example, based on determining that the ephemeris information is not valid, the wireless device may further transmit, to the network, an identifier of the NTN cell associated with the ephemeris information. For example, the certain message may further include the identifier of the NTN cell associated with the ephemeris information.

For example, based on determining that the ephemeris information is not valid, the wireless device may further transmit, to the network, information informing (1) information on measurement quality of the NTN cell measured during the service time of the NTN cell, or (2) information on measurement quality of the NTN cell measured outside the service time of the NTN cell.

For example, the certain message transmitted by the wireless device may be a Radio Resource Control (RRC) message. In other words, the RRC message may include (i) the information informing that the ephemeris information is not valid, (ii) the information on time at which the measurement on the NTN cell is able to be performed, (iii) information on time difference between the service time and the time at which the measurement on the NTN cell is able to be performed, (iv) the information on time difference between the service time and the time at which the measurement on the NTN cell is able to be performed, (v) the identifier of the NTN cell associated with the ephemeris information, (vi) information on measurement quality of the NTN cell measured during the service time of the NTN cell, and/or (vii) information on measurement quality of the NTN cell measured outside the service time of the NTN cell.

For example, the RRC message may be any one of an RRC Setup Complete message, an RRC Resume Complete message, an RRC Reconfiguration Complete message, or a UE Information Response message.

In step S1205, the wireless device may receive an updated ephemeris information. For example, the updated ephemeris information may include new service time of the NTN cell.

The wireless device may adjust the updated ephemeris information. That is, the wireless device may perform cell selection or handover to the NTN cell based on the updated ephemeris information.

According to some embodiments of the present disclosure, the wireless device may be in communication with at least one of a user equipment, a network, or an autonomous vehicle other than the wireless device.

Figure 13:
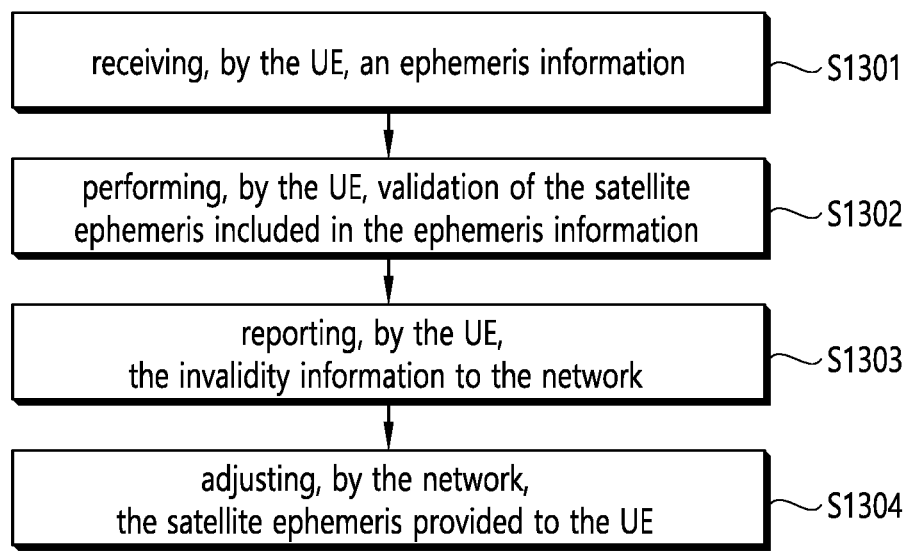
FIG. 13 shows an example of a method for validity feedback of ephemeris information for a NTN cell in a wireless communication system.

FIG. 13 shows an example of a method for validity feedback of ephemeris information for a NTN cell in a wireless communication system.

In the present disclosure, when ephemeris information including appearance periodicity and service time of each LEO satellite is provided to UEs, if the UE detects that the information is wrong or invalid (for example, particular LEO satellite does not appear within the configured service time), the UE may report the wrong configuration to the network. Based on the feedback report by the UE, the network may adjust/reconfigure the ephemeris information to the UE or a group of UEs.

Referring to FIG. 13, in step S1301, a UE may receive an ephemeris information.

The ephemeris information may be provided via broadcast system information. Then the UEs camping on the cell may use the ephemeris information.

The ephemeris information may be provided via dedicated signalling. Then the ephemeris information may be UE-specific to the UE.

The ephemeris information may include orbital trajectories of satellites as described above. The ephemeris information may include position, velocity, and angle of the satellites by time.

There may be NTN cells of the satellites which are included in the ephemeris information.

The ephemeris information may include satellite ephemeris. The satellite ephemeris may include list of satellites and schedule information which represents when each satellite in the list of satellites will be able to provide NTN service to UE.

The satellite ephemeris may include start time, service time duration, and periodicity of its appearance. Upon receiving the satellite ephemeris, first service time of the satellite may start at the received start time and it lasts for a time period of service time duration. After that, the service time of the satellite may return every periodicity with a time period of the service time duration. During the service time of the satellite, the UE may perform measurement on the satellite in order to access to the network.

Table 9 shows an example of satellite ephemeris and UE operation based on the satellite ephemeris.

TABLE 9

| Order | NTN Cell list (Upper case: frequency, lower case: cell) | Start time (UTC) | Service time duration | Periodicity |
|---|---|---|---|---|
| #1 | A: a1, a2 | 9:00 | 15 minutes | 2 h |
| #2 | B: b1, b2 | 9:10 | 10 minutes | 3 h |
| #3 | C: c1 | 9:15 | 15 minutes | 2 h 30 min |

Order #1: Service time of frequency A may start at 9:00 and may last until 9:15 (service time duration: 15 minutes). Therefore, UE may perform measurement on frequency A (cell al, cell a2) during the service time. After 2 hours (periodicity), the next service time may be from 11:00 UTC to 11:15 UTC.

Order #2: Service time of frequency B may start at 9:10 and may last until 9:20 (service time duration: 10 minutes). Therefore, UE may perform measurement on frequency B (cell b1, cell b2) during the service time. After 3 hours (periodicity), the next service time may be from 12:10 UTC to 12:20 UTC.

Order #3: Service time of frequency C may start at 9:15 and may last until 9:30 (service time duration: 15 minutes). Therefore, UE may perform measurement on frequency C (cell cl) during the service time. After 2 hours and 30 minutes (periodicity), the next service time may be from 11:45 UTC to 12:00 UTC.

In step S1302, based on the received ephemeris information, the UE may perform validation of the satellite ephemeris included in the ephemeris information as follows.

Criterion 1

If the UE is able to perform measurement on a satellite during service time of the satellite, the satellite ephemeris of the satellite may be considered as valid.
If the UE is not able to perform measurement on a satellite during service time of the satellite, the satellite ephemeris of the satellite may be considered as invalid.

Criterion 2

If the UE is able to perform measurement on a satellite during service time of the satellite during service time of the satellite, the satellite ephemeris of the satellite may be considered valid.
If the UE is not able to perform measurement on a satellite during service time of the satellite but the UE is able to perform measurement on a satellite outside of the service time of the satellite, the satellite ephemeris of the satellite may be considered as invalid.

One of the criteria may be used in the embodiment. The network may configure which criterion to be used. Multiple criteria may be used in the embodiment.

In the Above Criteria

If the UE is able to perform measurement on a satellite, it may mean that the UE can measure RSRP/RSRQ of the cell of the satellite. Equivalently, if the UE is not able to perform measurement on a satellite, it may mean that the UE cannot measure RSRP/RSRQ of the cell of the satellite.

Alternatively, if the UE is able to perform measurement on a satellite, it may mean that the UE can measure RSRP/RSRQ of the cell of the satellite, where the measurement quality is above a threshold. Equivalently, if the UE is not able to perform measurement on a satellite, it may mean that the UE cannot measure RSRP/RSRQ of the cell of the satellite or the measurement quality is below a threshold (assuming that the cell is detected).

In step S1303, based on the validation of the satellite ephemeris performed in the step S1302, if satellite ephemeris of a satellite is invalid, the UE may report the invalidity information to the network.

The invalidity information may include identifier of the cell/satellite corresponding to the invalid ephemeris.

The invalidity information may include an indication which indicates that the UE failed to measure the cell of the satellite within the configured service time.

The invalidity information may include whether the UE can measure the cell of the satellite outside the service time The invalidity information may include the measurement quality of the cell measured during the service time for the satellite (cell) in the ephemeris information The invalidity information may include the measurement quality of the cell measured outside the service time for the satellite (cell) in the ephemeris information.

The invalidity information may include the measurement quality of the cell measured during the service time for the satellite (cell) not included in the ephemeris information.

The invalidity information may include the measurement quality of the cell measured outside the service time for the satellite (cell) not included in the ephemeris information.

The invalidity information may include time information indicting when the UE can measure the cell of the satellite. The time information may also include time difference between the configured service time and the time when the cell of the satellite was truly measured.

The invalidity information may be included in the RRC-SetupComplete, or RRCResumeComplete, RRCReconfigurationComplete, or UEInformationResponse.

In step S1304, upon receiving the invalidity information, the network may adjust the satellite ephemeris provided to the UE. For example, the network may change the provided service time of the satellite by adjusting periodicity or service time duration of the satellite ephemeris or add/remove the satellite from the ephemeris information configured to the UE.

According to some embodiments of the present disclosure, the UE may receive ephemeris information from network, wherein the ephemeris information includes a time period of a satellite. The UE may perform measurement on the satellite within the time period. The US may send an indication to the network that the received ephemeris information is invalid, if the UE fails to perform measurement on the satellite within the time period.

Some of the detailed steps shown in the example of FIGS. 12 and 13 may not be essential steps and may be omitted. In addition, steps other than the steps shown in FIGS. 12 and 13 may be added, and the order of the steps may vary. Some of the above steps may have their own technical meaning.

Hereinafter, an apparatus for handling ephemeris information for a NTN cell in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, an ephemeris information related to a Non-Terrestrial Networks (NTN) cell. The ephemeris information may include information on service time of the NTN cell. The processor 102 may be configured to attempt to perform measurement on the NTN cell. The processor 102 may be configured to determine whether the ephemeris information is valid or not, based on whether the measurement on the NTN cell is able to be performed during the service time of the NTN cell. Based on determining that the ephemeris information is not valid, the processor 102 may be configured to control the transceiver

106 to transmit, to the network, (1) information informing that the ephemeris information is not valid and (2) information on time at which the measurement on the NTN cell is able to be performed.

For example, based on determining that the ephemeris information is not valid, the processor 102 may be configured to control the transceiver 106 to transmit, to the network, information on time difference between the service time and the time at which the measurement on the NTN cell is able to be performed.

For example, the processor 102 may be configured to determine that the measurement on the NTN cell is available based on that the wireless device is able to measure Reference Signal Received Power (RSRP) and/or Reference Signal Received Quality (RSRQ) for the NTN cell.

For example, the processor 102 may be configured to determine that the measurement on the NTN cell is available based on that the measured RSRP and/or RSRQ for the NTN cell is equal to or greater than a threshold value.

For example, the ephemeris information may be provided via broadcast system information from the network. For other example, the ephemeris information may be provided via a dedicated signalling from the network.

For example, the ephemeris information may include information on satellite ephemeris. The information on satellite ephemeris may include (i) list of satellites and (ii) schedule information for each satellite in the list of satellites. The schedule information may include information on service time in which the each satellite is able to provide NTN service to the wireless device.

For example, the processor 102 may be configured to determine that the ephemeris information is not valid, based on that (i) the measurement on the NTN cell is not able to be performed during the service time of the NTN cell, and (ii) the measurement on the NTN cell is able to be performed outside the service time of the NTN cell.

For example, based on determining that the ephemeris information is not valid, the processor 102 may be configured to control the transceiver 106 to transmit information informing that the measurement on the NTN cell is able to be performed outside the service time of the NTN cell.

For example, the processor 102 may be configured to control the transceiver 106 to transmit, to the network, a Radio Resource Control (RRC) message. The RRC message may include (1) the information informing that the ephemeris information is not valid and (2) the information on time at which the measurement on the NTN cell is able to be performed.

For example, the RRC message may be any one of an RRC Setup Complete message, an RRC Resume Complete message, an RRC Reconfiguration Complete message, or a UE Information Response message.

For example, based on determining that the ephemeris information is not valid, the processor 102 may be configured to control the transceiver 106 to transmit, to the network, an identifier of the NTN cell associated with the ephemeris information.

For example, based on determining that the ephemeris information is not valid, the processor 102 may be configured to control the transceiver 106 to transmit information informing (1) information on measurement quality of the NTN cell measured during the service time of the NTN cell, or (2) information on measurement quality of the NTN cell measured outside the service time of the NTN cell.

According to some embodiments of the present disclosure, the processor 102 may be configured to be in communication with at least one of a user equipment, a network, or an autonomous vehicle other than the wireless device.

Hereinafter, a processor for a wireless device for handling ephemeris information for a NTN cell in a wireless communication system, according to some embodiments of the present disclosure, will be described.

The processor may be configured to control the wireless device to receive, from a network, an ephemeris information related to a Non-Terrestrial Networks (NTN) cell. The ephemeris information may include information on service time of the NTN cell. The processor may be configured to control the wireless device to attempt to perform measurement on the NTN cell. The processor may be configured to control the wireless device to determine whether the ephemeris information is valid or not, based on whether the measurement on the NTN cell is able to be performed during the service time of the NTN cell. Based on determining that the ephemeris information is not valid, the processor may be configured to control the wireless device to transmit, to the network, (1) information informing that the ephemeris information is not valid and (2) information on time at which the measurement on the NTN cell is able to be performed.

For example, based on determining that the ephemeris information is not valid, the processor may be configured to control the wireless device to transmit, to the network, information on time difference between the service time and the time at which the measurement on the NTN cell is able to be performed.

For example, the processor may be configured to control the wireless device to determine that the measurement on the NTN cell is available based on that the wireless device is able to measure Reference Signal Received Power (RSRP) and/or Reference Signal Received Quality (RSRQ) for the NTN cell.

For example, the processor may be configured to control the wireless device to determine that the measurement on the NTN cell is available based on that the measured RSRP and/or RSRQ for the NTN cell is equal to or greater than a threshold value.

For example, the ephemeris information may be provided via broadcast system information from the network. For other example, the ephemeris information may be provided via a dedicated signalling from the network.

For example, the ephemeris information may include information on satellite ephemeris. The information on satellite ephemeris may include (i) list of satellites and (ii) schedule information for each satellite in the list of satellites. The schedule information may include information on service time in which the each satellite is able to provide NTN service to the wireless device.

For example, the processor may be configured to control the wireless device to determine that the ephemeris information is not valid, based on that (i) the measurement on the NTN cell is not able to be performed during the service time of the NTN cell, and (ii) the measurement on the NTN cell is able to be performed outside the service time of the NTN cell.

For example, based on determining that the ephemeris information is not valid, the processor may be configured to control the wireless device to transmit information informing that the measurement on the NTN cell is able to be performed outside the service time of the NTN cell.

For example, the processor may be configured to control the wireless device to transmit, to the network, a Radio Resource Control (RRC) message. The RRC message may include (1) the information informing that the ephemeris information is not valid and (2) the information on time at which the measurement on the NTN cell is able to be performed.

For example, the RRC message may be any one of an RRC Setup Complete message, an RRC Resume Complete message, an RRC Reconfiguration Complete message, or a UE Information Response message.

For example, based on determining that the ephemeris information is not valid, the processor may be configured to control the wireless device to transmit, to the network, an identifier of the NTN cell associated with the ephemeris information.

For example, based on determining that the ephemeris information is not valid, the processor may be configured to control the wireless device to transmit information informing (1) information on measurement quality of the NTN cell measured during the service time of the NTN cell, or (2) information on measurement quality of the NTN cell measured outside the service time of the NTN cell.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for handling ephemeris information for a NTN cell in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, an ephemeris information related to a Non-Terrestrial Networks (NTN) cell. The ephemeris information may include information on service time of the NTN cell. The stored a plurality of instructions may cause the wireless device to attempt to perform measurement on the NTN cell. The stored a plurality of instructions may cause the wireless device to determine whether the ephemeris information is valid or not, based on whether the measurement on the NTN cell is able to be performed during the service time of the NTN cell. Based on determining that the ephemeris information is not valid, the stored a plurality of instructions may cause the wireless device to transmit, to the network, (1) information informing that the ephemeris information is not valid and (2) information on time at which the measurement on the NTN cell is able to be performed.

For example, based on determining that the ephemeris information is not valid, the stored a plurality of instructions may cause the wireless device to transmit, to the network, information on time difference between the service time and the time at which the measurement on the NTN cell is able to be performed.

For example, the stored a plurality of instructions may cause the wireless device to determine that the measurement on the NTN cell is available based on that the wireless device is able to measure Reference Signal Received Power (RSRP) and/or Reference Signal Received Quality (RSRQ) for the NTN cell.

For example, the stored a plurality of instructions may cause the wireless device to determine that the measurement on the NTN cell is available based on that the measured RSRP and/or RSRQ for the NTN cell is equal to or greater than a threshold value.

For example, the ephemeris information may be provided via broadcast system information from the network. For other example, the ephemeris information may be provided via a dedicated signalling from the network.

For example, the ephemeris information may include information on satellite ephemeris. The information on satellite ephemeris may include (i) list of satellites and (ii) schedule information for each satellite in the list of satellites. The schedule information may include information on service time in which the each satellite is able to provide NTN service to the wireless device.

For example, the stored a plurality of instructions may cause the wireless device to determine that the ephemeris information is not valid, based on that (i) the measurement on the NTN cell is not able to be performed during the service time of the NTN cell, and (ii) the measurement on the NTN cell is able to be performed outside the service time of the NTN cell.

For example, based on determining that the ephemeris information is not valid, the stored a plurality of instructions may cause the wireless device to transmit information informing that the measurement on the NTN cell is able to be performed outside the service time of the NTN cell.

For example, the stored a plurality of instructions may cause the wireless device to transmit, to the network, a Radio Resource Control (RRC) message. The RRC message may include (1) the information informing that the ephemeris information is not valid and (2) the information on time at which the measurement on the NTN cell is able to be performed.

For example, the RRC message may be any one of an RRC Setup Complete message, an RRC Resume Complete message, an RRC Reconfiguration Complete message, or a UE Information Response message.

For example, based on determining that the ephemeris information is not valid, the stored a plurality of instructions may cause the wireless device to transmit, to the network, an identifier of the NTN cell associated with the ephemeris information.

For example, based on determining that the ephemeris information is not valid, the stored a plurality of instructions may cause the wireless device to transmit information informing (1) information on measurement quality of the NTN cell measured during the service time of the NTN cell, or (2) information on measurement quality of the NTN cell measured outside the service time of the NTN cell.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for handling ephemeris information for a NTN cell in a wireless communication system, according to some embodiments of the present disclosure, will be described.

The BS may transmit, to a wireless device, an ephemeris information related to a Non-Terrestrial Networks (NTN) cell. The ephemeris information may include information on service time of the NTN cell. Based on that the wireless device determines that the ephemeris information is not valid, the BS may receive, to the network, (1) information informing that the ephemeris information is not valid and (2) information on time at which the measurement on the NTN cell is able to be performed.

Hereinafter, a base station (BS) for handling ephemeris information for a NTN cell in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, an ephemeris information related to a Non-Terrestrial Networks (NTN) cell. The ephemeris information may include information on service time of the NTN cell. Based on that the wireless device determines that the ephemeris information is not valid, the processor may be configured to control the transceiver to receive, to the network, (1) information informing that the ephemeris information is not valid and (2) information on time at which the measurement on the NTN cell is able to be performed.

The present disclosure can have various advantageous effects.

According to some embodiments of the present disclosure, a wireless device could perform validity feedback of ephemeris information for a NTN cell efficiently.

According to some embodiments of the present disclosure, a wireless device could efficiently report an error in the ephemeris information.

According to some embodiments of the present disclosure, a network could efficiently update the ephemeris information for a wireless device.

For example, if ephemeris information of a satellite is mis-configured (that is, the configured satellite ephemeris is wrong so that the UE cannot measure the cell of the satellite on a configured time), the UE could report to the network that there was an error in the ephemeris information so that the network can update or adjust the ephemeris information based on the received information.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising,
   receiving, from a network, an ephemeris information related to a non-terrestrial network cell, wherein the ephemeris information includes information related to service time for the non-terrestrial network;
   performing a first measurement for Reference Signal Received Power (RSRP) value and/or Reference Signal Received Quality (RSRQ) value for the non-terrestrial network cell within the service time;
   based on that the RSRP value and/or RSRQ value for the non-terrestrial network cell is less than a threshold value, determining that (i) measurement for the non-terrestrial network cell is not available within the service time for the non-terrestrial network cell and (ii) that the ephemeris information is not valid; and
   transmitting, to the network, (i) first information informing that the ephemeris information is not valid and (ii) second information informing whether the measurement for the non-terrestrial network cell is available outside the service time for the non-terrestrial network cell or not,
   wherein the second information is determined based on a second measurement for RSRP value and/or RSRQ value for the non-terrestrial network cell which is performed outside the service time for the non-terrestrial network cell.

2. The method of claim 1, wherein the method further comprises,
   based on that the RSRP value and/or RSRQ value for the non-terrestrial network cell derived from the second measurement is greater than or equal to the threshold value, determining that the measurement for the non-terrestrial network cell is available outside the service time for the non-terrestrial network cell; and
   transmitting, to the network, third information informing related to a time point at which the second measurement is performed.

3. The method of claim 1, wherein the ephemeris information is provided via broadcast system information from the network.

4. The method of claim 1, wherein the ephemeris information is provided via a dedicated signalling from the network.

5. The method of claim 1, wherein the ephemeris information includes information related to satellite ephemeris, wherein the information related to the satellite ephemeris includes (i) list of satellites and (ii) schedule information for each satellite in the list of satellites.

6. The method of claim 5, wherein the schedule information includes information related to service time in which the each satellite is able to provide non-terrestrial network service to the wireless device.

7. The method of claim 1, wherein the method further comprises,
wherein the first information and the second information are included in a radio resource control message.

8. The method of claim 7, wherein the radio resource control message is any one of a radio resource control connection Setup Complete message, a radio resource control connection Resume Complete message, a radio resource control connection Reconfiguration Complete message, or a UE Information Response message.

9. The method of claim 1, wherein the method further comprises,
transmitting, to the network, an identifier of the non-terrestrial network cell associated with the ephemeris information.

10. The method of claim 1, wherein the wireless device is in communication with at least one of a user equipment, a network, or an autonomous vehicle other than the wireless device.

11. A wireless device in a wireless communication system comprising:
a transceiver;
a memory; and
at least one processor operatively coupled to the transceiver and the memory, and configured to:
control the transceiver to receive, from a network, an ephemeris information related to a non-terrestrial network cell, wherein the ephemeris information includes information related to service time for the non-terrestrial network cell;
perform a first measurement for Reference Signal Received Power (RSRP) value and/or Reference Signal Received Quality (RSRQ) value for the non-terrestrial network cell within the service time;
based on that the RSRP value and/or RSRQ value for the non-terrestrial network cell is less than a threshold value, determine that (i) measurement for the non-terrestrial network cell is not available within the service time for the non-terrestrial network cell and (ii) that the ephemeris information is not valid; and
control the transceiver to transmit, to the network, (i) first information informing that the ephemeris information is not valid and (ii) second information informing whether the measurement for the non-terrestrial network cell is available outside the service time for the non-terrestrial network cell or not,
wherein the second information is determined based on a second measurement for RSRP value and/or RSRQ value for the non-terrestrial network cell which is performed outside the service time for the non-terrestrial network cell.

12. A non-transitory computer-readable medium having stored thereon a plurality of instructions, which, when executed by a processor of a wireless device, cause the wireless device to perform operations, wherein the operations comprises,
receiving, from a network, an ephemeris information related to a non-terrestrial network cell, wherein the ephemeris information includes information related to service time for the non-terrestrial network cell;
performing a first measurement for Reference Signal Received Power (RSRP) value and/or Reference Signal Received Quality (RSRQ) value for the non-terrestrial network cell within the service time;
based on that the RSRP value and/or RSRQ value for the non-terrestrial network cell is less than a threshold value, determining that (i) measurement for the non-terrestrial network cell is not available within the service time for the non-terrestrial network cell and (ii) that the ephemeris information is not valid; and
transmitting, to the network, (i) first information informing that the ephemeris information is not valid and (ii) second information informing whether the measurement for the non-terrestrial network cell is available outside the service time for the non-terrestrial network cell or not,
wherein the second information is determined based on a second measurement for RSRP value and/or RSRQ value for the non-terrestrial network cell which is performed outside the service time for the non-terrestrial network cell.

* * * * *